United States Patent [19]

Steinich

[11] Patent Number: 5,761,822
[45] Date of Patent: Jun. 9, 1998

[54] MEASURING CORD DISPLACEMENT TRANSDUCER WITH SHELL-LIKE HOUSING

[75] Inventor: Klaus-Manfred Steinich, Unterhaching, Germany

[73] Assignee: ASM Automation Sensorik Messtechnik GmbH, Unterhaching, Germany

[21] Appl. No.: 657,243

[22] Filed: Jun. 3, 1996

[30] Foreign Application Priority Data

Jun. 2, 1995 [DE] Germany ............... 195 20 388.7

[51] Int. Cl.⁶ ...................................................... G01B 3/10
[52] U.S. Cl. ............................................. 33/756; 33/762
[58] Field of Search ........................... 33/1 PT, 706, 33/707, 708, 756, 762, 769

[56] References Cited

U.S. PATENT DOCUMENTS

| | | | |
|---|---|---|---|
| 3,780,440 | 12/1973 | Taylor | 33/756 |
| 4,178,691 | 12/1979 | Tateishi | 33/762 |
| 4,186,490 | 2/1980 | Quenot | 33/762 |
| 4,575,944 | 3/1986 | Lin | 33/762 |
| 4,587,738 | 5/1986 | Kang | 33/762 |
| 4,790,492 | 12/1988 | Atobe | 33/762 |
| 5,286,972 | 2/1994 | Falk et al. | 33/756 |

FOREIGN PATENT DOCUMENTS

| | | |
|---|---|---|
| 8801109 U | 7/1988 | Germany . |
| 3707963A1 | 9/1988 | Germany . |
| 3833203C1 | 2/1990 | Germany . |
| 4217607C2 | 4/1995 | Germany . |
| 168461 | 2/1965 | U.S.S.R. ............... 33/762 |
| 1490446 | 6/1989 | U.S.S.R. ............... 33/756 |

*Primary Examiner*—G. Bradley Bennett
*Attorney, Agent, or Firm*—Evenson, McKeown, Edwards & Lenahan, PLLC

[57] ABSTRACT

The invention relates to a measuring cord displacement transducer. A sealed measuring cord displacement transducer is proposed which has a measuring cord, a cord drum, a flat spiral spring which, with the cord drum, is arranged coaxially in a rotationally fixed manner on the same shaft, having a rotary encoder connected to the shaft and a housing surrounding the displacement transducer with a mechanical interior and an electrical interior which are separate and spaced apart axially in the longitudinal direction of the shaft, so that the cord drum and the flat spiral spring can be accommodated in the mechanical interior and the rotary encoder and the associated electronics can be accommodated in the electrical interior. In this case, the housing of the mechanical interior is formed by two shell-like, respectively one-piece bearing shells. As a result of the accommodation of the mechanical part of the measuring cord displacement transducer in one-piece, half-shell-like bearing shells instead of the previously used construction of tubular sections, end plates and intermediate plates, improved fitting accuracy, stability and hence improved tightness are achieved. As a result of the two bearing shells fitting into each other in a positively locking manner in the axial and radial direction, the mounting of the measuring cord displacement transducer, above all of the mechanical part, is considerably simplified.

36 Claims, 3 Drawing Sheets

MEASURING CORD DISPLACEMENT TRANSDUCER WITH SHELL-LIKE HOUSING

BACKGROUND OF THE INVENTION

1. Field of the Invention

The invention relates to a measuring cord displacement transducer, in which a measuring cord is fastened with one end to a cord drum and with the other end to that object whose distance in relation to the measuring cord displacement transducer is intended to be measured. The cord drum in this arrangement is pretensioned in the wound-up direction, for example in the present instance by means of a flat spiral spring without winding interspace. An rotary encoder fastened to the cord drum, for example a rotary potentiometer, determines the respective position from the sensor of the component arranged at the free end of the measuring cord.

2. Description of Related Art

An object of this type is disclosed, for example, in German Offenlegungsschrift 42 17 607, but does not have the cord drum and spiral spring coaxial but arranged alongside each other and connected to each other by means of a reduction gearbox.

For a series of applications it is important that, because of the moist and dirty environment on the one hand and because of the passive influence of the electronics on the other hand, such a measuring cord displacement transducer is intended to be designed as tightly as possible both from an electromagnetic and from a physical point of view, and in addition must satisfy the normal properties such as low susceptibility to wear, simple and inexpensive construction, etc.

SUMMARY OF THE INVENTION

As a result of the accommodation of the mechanical part of the measuring cord displacement transducer in one-piece, half-shell-like bearing shells instead of the previously used construction of tubular sections, end plates and intermediate plates, improved fitting accuracy, stability and hence improved tightness is achieved according to the invention.

As a result of the two bearing shells fitting into each other in a positive locking manner in the axial and radial direction, the mounting of the measuring cord displacement transducer, above all of the mechanical part, is considerably simplified:

In particular if the flat spiral spring can be accommodated in one bearing shell and the cord drum can be accommodated in the other bearing shell, it is possible firstly to insert the flat spiral spring, connected to the carrying shaft, into the one bearing shell and subsequently to connect the shaft of the cord drum to the other bearing shell, if necessary after the insertion of the cord attachment into this other bearing shell. Then, after the two bearing shells adjoin each other in the axial direction, the flat spiral spring can be wound up by rotating the two bearing shells about the longitudinal axis, in order to further ensure the necessary pretension of the cord drum even in the wound-up state of the cord.

Furthermore, the bearing shells can be equipped with an optimally dimensioned interior in adaptation to the components to be accommodated:

The bearing shell accommodating the flat spiral spring in this arrangement has an inner contour which is approximately circular with a radial bulge for the accommodation of the fastening pin for the outer, free end of the flat spiral spring, which is screwed into this bearing shell. Since the flat spiral spring expands radially until it comes to rest on a corresponding resistance, it was necessary in the case of a housing produced from a four-sided tube for the flat spiral spring to be bounded by a multiplicity of stop pins which were distributed over the circumference and screwed into the end plate. By means of shaping the interior in accordance with the desired outer circumference of the flat spiral spring, an optimal contact is given here without separate parts having to be mounted as an outer stop.

Likewise, the free space in the bearing shell which accommodates the cord drum is dimensioned in such a way that the cross section is essentially circular, corresponding to the circular circumference of the cord drum, and is only such a little larger in diameter that winding the cord drum only with one layer of the measuring cord is possible. As a result, overwinding of the measuring cord in a plurality of layers, which furnishes an imprecise indication result, is avoided. In the case of a four-cornered housing, the otherwise circular interior of this bearing shell is broadened only towards one corner, in order to produce there the necessary free space for the cord entry and the cord attachment which is placed for this on the bearing shell.

The cord attachment can preferably be fastened from the outside on the bearing shell, so that it is possible to exchange it without dismantling the measuring cord displacement transducer. Inserted into the cord attachment is a sliding piece which is penetrated in the manner of a bush by a bore in which the measuring cord runs, and has a low frictional coefficient with respect to the material of the measuring cord, that is to say in the case of steel as a rule consists of a plastic or, for example, vice versa. In this arrangement, the sliding piece is broadened toward the inside in a trumpet shape, so that a deflection of the cord over the longitudinal extent of the cord drum is possible at any time, depending on the instantaneous winding condition.

A cord wiper, for keeping the cord clean, can be placed on the outside on the cord attachment.

One bearing shell of the two bearing shells which bound the electrical interior is equipped with a coaxial through opening for the penetration of the shaft. On the end of this bearing shell, on the outside, a can-shaped housing can be placed and fastened, in which the electrical part of the displacement transducer is then located, the flat spiral spring, the cord drum and the rotatable extension of the rotary encoder being arranged on the same shaft. The latter is preferably radially supported by means of sliding bearings in the through bearing opening of the one bearing shell, and is supported both radially and axially in a bearing opening, shaped like a blind hole, of the other bearing shell, by means of a sliding disk at the bottom of this bearing opening which is shaped like a blind hole.

The through opening is, moreover, sealed against moisture and dust via a V seal, so that the contaminants, which penetrate into the mechanical part of the transducer in spite of the small opening at the cord entry, cannot pass into the electrical part of the sensor. The V seal rests in an annular groove, which represents a broadening of the penetrating bearing opening in the one bearing shell, with a free sealing limb pointing into the corner of the groove.

The shaft projects only relatively little into the electrical interior of the transducer. The pivot pin of the rotary encoder is plugged into an end hole in the shaft and fixed there by means of a clamping screw. Since the plugged-in pivot pin of the rotary encoder does not usually align with the latter 100%, a fastening of the rotary encoder on the enclosing housing would require an angular offset between the pivot pin of the rotary encoder and the shaft carrying the mechanical parts of the transducer, which can only be realized by means of a complicated construction.

In order to avoid this, the pivot pin is connected to the shaft virtually without play, that is to say as firmly as possible, and the rotary encoder is left protruding freely.

However, since corotation of the rotary encoder is to be avoided, whilst permitting a slight unbalance of the rotary encoder, the latter is only firmly fixed using a radially projecting fork made of an elastic material, for example a sheet metal material. The projecting end of this sheet metal fork is positively connected to a point fixed to the housing in such a way that rotation of the sheet metal fork and hence of the rotary encoder about its axis of rotation is avoided with as little play as possible, but the movements which take place on account of the unbalance of the rotary encoder, and the movements of the sheet metal fork, are accommodated by the play available in the longitudinal direction of the sheet metal fork.

For this purpose, the greatest possible effective length of the sheet metal fork is also desired, for which reason the latter, in the case of a rotary encoder fastened centrally coaxially in an approximately four-sided housing, preferably points into one corner of the housing.

As a point fixed to the housing, in this arrangement use is preferably made of a non-round bolt which extends parallel to the axis of the rotary encoder and which is embraced by the fork-shaped end of the sheet metal fork. After assembly, by means of rotating the non-round bolt, the situation can be achieved where the latter rests on both flanks of the sheet metal fork with as little play as possible, but without pressure, and hence a play-free connection is achieved between the non-round pin and the sheet metal fork in the circumferential direction of the rotary encoder. A hexagonal bolt is preferably used for this, this bolt being able to serve at the same time for the screw fixing of the can-shaped electrical housing to the adjacent bearing shell, which contributes to a reduction of the number of parts.

Arranged in a floating manner around the rotary encoder is a circuit board which carries the electronic components of the transducer. The electrical connection of the transducer to the components cooperating herewith is carried out via a plug part which is preferably let into the end of the can-shaped housing.

In order to ensure the special shaping, above all of the bearing shells, at least these bearing shells are produced using the casting process or flow press process, preferably from light metal such as, for example, aluminum or, in the case of pressure casting, from zinc.

In the case of the use of non-conductive materials, at least the electrical housing and the adjacent bearing shell are to be equipped with a conductive surface coating, in order to avoid active or passive electromagnetic influencing of at least the electrical part of the transducer. In the case of production from conductive materials, too, such as for example aluminum, it can be necessary to equip aluminum, which in the untreated state can corrode very rapidly on its surface and would thus become non-conductive, with a conductive surface coating, for example by means of chrome plating, aludining or cadmium plating, for the same reason. For this, too, correspondingly great wall thicknesses are to be provided, and in the case of non-round, preferably square, outer cross section, to select the wall thicknesses to be as great as possible, above all in the corner regions, as a result of which optimal insulation from electromagnetic radiation is already provided over a large part of the circumference.

At the joints of the transducer housing, in addition to the sealing against dust and moisture by means of rubber seals etc., in this arrangement a sufficiently great axial overlap of the individual parts of the housing is also to be provided, in order thereby in turn to increase the electromagnetic tightness.

BRIEF DESCRIPTION OF THE DRAWINGS

An exemplary embodiment in accordance with the invention is described in more detail below by way of example, with reference to the figures, in which.

DESCRIPTION OF THE PREFERRED EMBODIMENT

Figure 1:
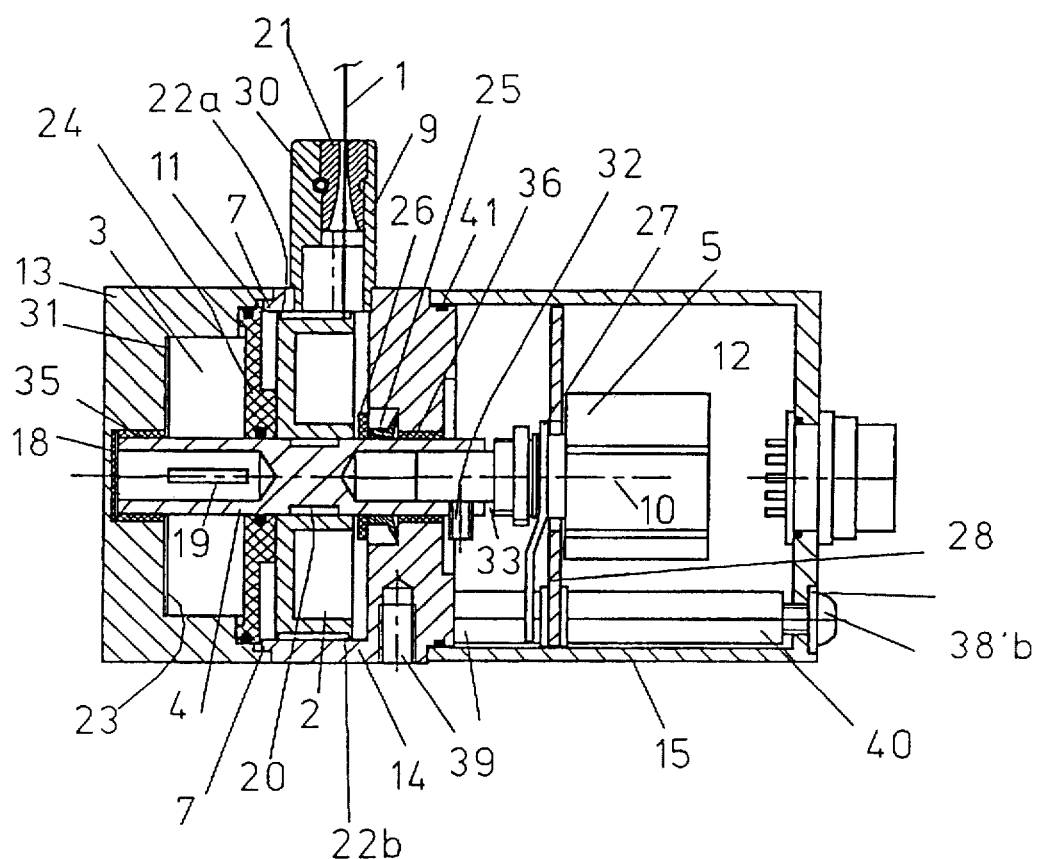
FIG. 1 shows a measuring cord displacement transducer in longitudinal section.

FIG. 1 shows the shaft 4, which runs in the longitudinal direction 10, runs axially through the bearing shell 14 and is supported there via the radial bearing 36, while the left hand end is supported via a radial bearing 35 and an axial sliding disk 18 in a cup-shaped bearing depression 16 in the bottom surface 23 of the bearing shell 13. The mechanical interior 11, in which the cord drum 2 and the flat spiral spring 3 and further components are accommodated, is thus formed between the bearing shells 13 and 14. The shaft 4 projects in FIG. 1 with its right hand end ending freely into the electrical interior 12 which is formed by upsetting a can-shaped electrical housing 15 with its open side on the bearing shell 14 which is penetrated by the shaft 4.

In this arrangement, the shaft 4 is connected on one side to the cord drum 2 in a rotationally fixed manner, in that in this region there lies in an annular groove of the outer circumference of the shaft 4 a tolerance ring 20, over which the cord drum 2 with its corresponding internal diameter can be pushed in the axial direction and is then positively connected to the shaft 4 in a force-fitting manner. For this purpose, the tolerance ring 20, which is not shown in detail in the figures, and which is opened at one point on its circumference by a slot, has an approximately corrugated contour in the cross-sectional representation and consists of an elastic material such as, for example, sheet metal, so that as a result of pushing on the inner diameter of the cord drum 2, which is smaller than the outer diameter of the tolerance ring 20 in the rest condition, this corrugated contour is pressed somewhat flat and hence produces the force connection.

Likewise connected in a rotationally fixed manner to the shaft 4 is the flat spiral spring 3, whose inner end is connected to the shaft 4 by pushing a bent-over portion of the flat spiral spring 3 into a radial slot 19 in the wall of the said shaft 4. The outer free end of the flat spiral spring 3 is firmly fixed using a fixing pin 6 which is screwed parallel to the longitudinal direction 10 into a corresponding bore 6' in the bottom surface 23 of the bearing shell 13, as can be seen better in FIG. 2.

As a result, the shaft 4—after winding up the flat spiral spring 3, which as a rule has no winding interspace—and with it the cord drum 2 is pretensioned in the winding-up direction of rotation of the measuring cord 1.

Figure 2:
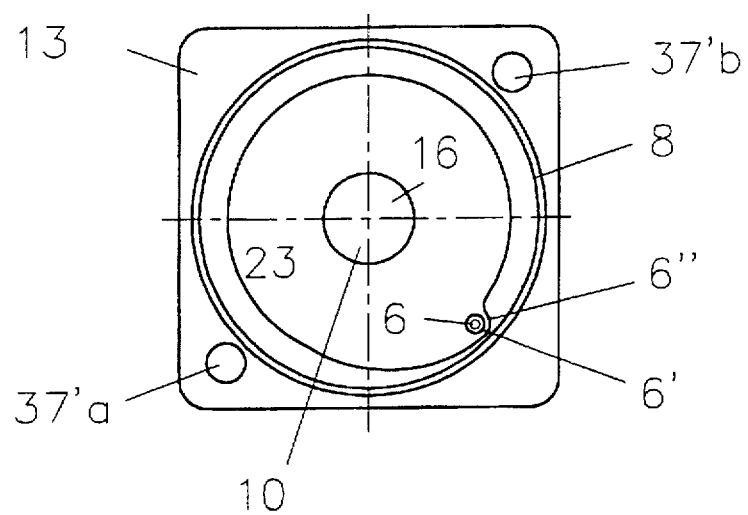
FIG. 2 shows a top view on the bearing shell 13 from the spacer 24 outward.

As can be seen in the top view of FIG. 2, the recess for the flat spiral spring 3 is approximately circular as far as a bulge 6", from which the wall runs spirally into the otherwise circular inner diameter. This recess 6" is sufficiently large in the radial direction that the accommodation of the fixing pin 6 can be effected therein with the consequence that the flat spiral spring 3 otherwise rests on the bearing shell 13 over the entire inner circumference of the interior, without special stops having to be mounted for this.

As FIG. 1 further shows, the radial bearing 35, which is a sliding bearing like the radial bearing 36, projects somewhat axially beyond the bottom surface 23, in order to hold the flat spiral spring 3 at a spacing 31 from the bottom surface 23. Adjacent to the other side of the flat spiral spring 3 is a spacer 24 whose outer diameter is greater than the outer diameter of the bottom surface 23 and hence of the flat spiral spring 3. This spacer 24 produces the correct axial spacing between the flat spiral spring 3 and the coaxially adjacent cord drum 2, and for this purpose has as small a side bearing surface as possible in relation to the rotating cord drum 2, in order to keep the sliding friction here as small as possible. Furthermore, the spacer 24 is preferably sealed both at the outer circumference with respect to the housing and at the inner circumference with respect to the shaft 4 carrying it, for example by means of inlaid O rings in corresponding annular grooves of the outer surfaces of the spacer 24.

The cord drum 2 has, in its circumferential region, an annular groove, whose depth is only slightly greater than the thickness of the measuring cord 1, and which extends over approximately the entire axial extent of the cord drum 2, so that only the end flanks 22a, 22b of the latter remain at the outer diameter. These flanks reach radially outward as far as close to the corresponding inner diameter in the bearing shell 14. This ensures that the winding up of the measuring cord 1, which at the beginning of the winding up begins aligned with the opening for the measuring cord at one flank 22b, progresses in a single winding layer as far as the opposite flank 22a, and overwinding in a second layer is prevented.

For this purpose, the measuring cord 1 is not guided directly in the outer wall of the bearing shell 14, but through the opening, expanding inward in a trumpet shape, of a bush-like sliding piece 21, whose material has an optimally low frictional coefficient in relation to the material of the measuring cord 1, and which in turn is inserted into the outer end of a through opening of a cord attachment 9 and can be fixed there by means of a clamping screw 30, which diverges radially outward from the bearing shell 14, or by being stuck in.

Figure 3:
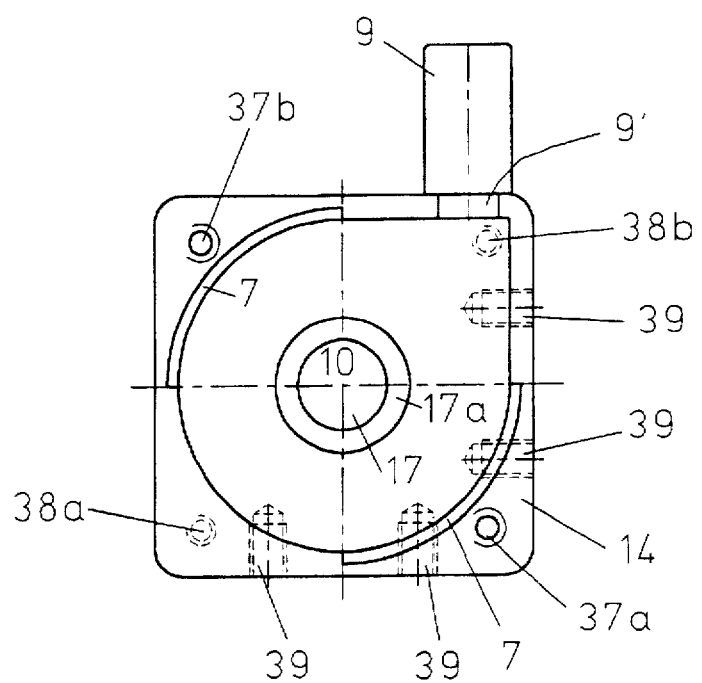
FIG. 3 shows a top view on the bearing shell 14 from the spacer 24 outward.

As can be seen better in the top view of FIG. 3 of the bearing shell 14, the latter has an inner diameter which is circular over approximately 270° and only towards one corner corresponds to the outer contour of the bearing shell 14, as a rule a square. In this broadening, reaching into the corner, the cord attachment 9 is inserted as far as possible in the corner, in order to lead the measuring cord 1 as tangentially as possible onto the cord drum 2, which fills the interior of the bearing shell 14 to the largest possible extent.

The cord attachment can in this case be able to be pushed axially in a positively locking manner into the wall of the bearing shell 14 from its free side or can also be configured to be able to be inserted into the bearing shell 14 from the outside in the longitudinal direction of the cord, which facilitates the exchanging both of the cord attachment 9 and of the sliding piece 31 in the cord attachment 9.

As FIG. 3 shows further, there are arranged in the four corners of the bearing shell 14, on both sides, in each case two screw fixings 37a, 37b and 38a, 38b, which are arranged in respectively opposite corners. The screw fixings 37a, 37b in this case are used for the screw fixing to the bearing shell 13 which is closed at the end, and are located in the two opposite corners, consisting of solid material, of the bearing shell 14.

In the two other corners, from the other end, there are located analogous threaded blind holes as screw fixing 38b, which are used for the screw fixing of the bearing shell 14 to the electrical housing 15. In this case, one threaded hole 38b is located in that corner of the bearing shell 14 which is not of solid design, but has only such a depth that the bearing shell 14 is not penetrated hereby.

Moreover, in the solid bottom of the bearing shell 14, threaded holes 39, which are shaped like blind holes, are further located in at least two adjacent outer surfaces and serve for the screw fixing of the entire transducer to a component carrying it.

In FIG. 3, furthermore, it is possible to see the guide curves 7, which are constructed over two sectors of 45° in each case, which project with respect to the end face of the bearing shell 14 which can be seen in FIG. 3 and are located in two opposite sectors along the solidly designed corners and hence in the region of the screw fixing 37a, 37b. In the opposite end face of the bearing shell 13 there is provided a recess 8 which corresponds but runs around in a ring shape, with the result that the two bearing shells 13, 14 can be placed in each other axially and as a result connected to each other in a radially positively locking manner, and nevertheless in this condition can be rotated relative to each other about the longitudinal direction 10.

This makes possible a procedure during the mounting of the mechanical part, and in this arrangement above all in the mounting of the dangerous flat spiral spring 3, whose inherent tension is so high that it represents a considerable source of danger, because of its sharp edges, when opening the tightly wound state:

After the insertion of the sliding disk 18 into the bearing depression 16 of the bearing shell 13, and of the radial bearing 35, the flat spiral spring 3 is connected to the shaft 4 in a rotationally fixed manner, using the bent-over portion of its inner end, by pushing it into the slot 19 of the wall of the shaft 4 in this region, and the end of the shaft 4 is inserted into the bearing depression 16 of the bearing shell 13 and the outer free end of the flat spiral spring 3 is firmly connected to the bearing shell 13 by screwing the fixing pin 6 into the corresponding threaded hole 6' in the bottom 23. By means of subsequently pushing on the spacer 24 and the tolerance ring 20 into the corresponding annular groove of the shaft 4, the cord drum 2 is pushed onto the tolerance ring 20 axially from the free end, and then so is the run-on disk 26.

As a result, all the movable parts are already firmly connected to one another in the radial direction by means of the shaft 4, so that the bearing shell 14, which is now provided with the radially protruding cord attachment 9, together with the inserted V seal 25 and inserted radial bearing 36, is pushed over the free end of the shaft 4 until the bearing shells 13 and 14 are in close contact with each other via the slide curves 7 and the corresponding recess 8.

Now, by means of relative rotation of the two bearing shells 13 and 14 relative to each other, the flat spiral spring 3 is pretensioned through a plurality of revolutions, with the measuring cord 1 wound up, to such an extent that there is still a sufficient pretension of the cord drum 2 in the wound-up direction even in the completely wound up condition of the measuring cord 1.

In this arrangement, the V seal 25 lies with its obliquely outwardly extending annular edge on the end face of a broadening 17a of the axially penetrating bearing opening 17 on the side of the mechanical interior 11. The outer circumference of the broadening 17a is removed only very little in the radial direction from the outer circumference of the V seal 25, with the result that an additional labyrinth effect for this seal is produced as a result of this small spacing. The run-on disk 26 has an outer diameter which is smaller than the outer diameter of the broadening 17a, so that the run-on disk 26 rests on the seal 25 and not on the bottom surface of the bearing shell 14. Spacer 24, run-on disk 26 and the seal 25 have an inner diameter which corresponds to the outer diameter of the shaft 4.

As FIG. 1 further shows, the shaft, as a solid shaft, is provided from both ends with axial bores which reach as far as the end regions of the cord drum 2, so that an optimal stability is afforded in the radial direction with a minimum weight in the region of the cord drum 2.

The rotary encoder 5 with its pivot pin 33 is plugged into the right hand end opening and is clamped in a non-positive manner by means of a transversely running clamping screw 32. The rotary encoder 5 is thus located freely projecting in the electrical interior 12, in order to be able to balance out an unbalance of the pivot pin 33 in relation to the actual rotary encoder 5. Loose around the rotary encoder 5 there is also a circuit board 28, which extends transverse to the longitudinal direction 10 in the electrical interior 12, is likewise arranged such that it does not corotate and is connected to the bearing shell 14 by means of the screw fixing 38b. In this arrangement, the circuit board 28 can be arranged, as shown, on that side of the rotary encoder facing the bearing shell 14, but also on that side remote from the latter, within the electrical interior 12.

As a securing means against a corotation of the rotary encoder 12, use is made of a sheet metal fork 27, which projects radially from the latter and is connected to it in a rotationally fixed manner, and whose fork-shaped free end embraces a hexagonal bolt 40. This hexagonal bolt 40 is a component of the screw fixing 38 between the electrical housing 15 and the bearing shell 14, in that the hexagonal bolt 40 has on one side a threaded bolt which projects at the end, with which it is screwed into the bearing shell 14, and has on the opposite side a corresponding internal thread into which the screw 38b penetrating the electrical housing 15 can be screwed. Using this screw 38'b, it is thus possible to undertake—via an interposed O ring seal 41—not only the axial screw fixing between the electric housing 15 and bearing shell 14 but also, by rotating the hexagonal bolt 40 before placing on the electrical housing 15, its contact on both inner flanks of the fork-shaped end of the sheet metal fork 27 can be set to be as free of play as possible, with the result that, although a radial movement between the sheet metal fork 27 and the bolt is possible, such as is produced during tumbling movements of the rotary encoder 12, no rotation of the rotary encoder is possible.

In order to achieve as small a bearing surface as possible, and hence a knife-blade-like bearing between the hexagonal bolt 40 and the sheet metal fork 27, the sheet metal fork 27 consists of an at most 1 mm thick sheet metal material, which is additionally etched, as a result of which, at the circumferential edges, above all in the region directed towards the hexagonal bolt 40, a sharp blade is formed which, without the etching, would have to be produced by means of mechanical machining and hence in a manner involving significantly more work.

I claim:
1. An essentially sealed measuring cord displacement transducer, comprising:
   a measuring cord,
   a cord drum mounted on a shaft for winding up the measuring cord,
   a flat spiral spring, which is arranged coaxial with the cord drum on the shaft in a rotationally fixed manner,
   an angular encoder connected to the shaft, and
   a housing surrounding the displacement transducer and having a mechanical interior and an electrical interior which are separate and spaced apart axially in a longitudinal direction of the shaft so that the cord drum and the flat spiral spring are accommodated in the mechanical interior and the angular encoder and associated electronics are accommodated in the electrical interior, wherein the housing of the mechanical interior is formed by two one-piece bearing shells.

2. The measuring cord displacement transducer as claimed in claim 1, wherein the bearing shells can be plugged into each other in a radially and axially positively locking manner and, as a result, can be rotated in relation to each other about the longitudinal direction.

3. The measuring cord displacement transducer as claimed in claim 1, wherein the housing for the electrical interior is formed by a cup-shaped, single-piece electrical housing which is placed on an end of one of the bearing shells.

4. The measuring cord displacement transducer as claimed in claim 1, wherein the axial extent of the bearing shells is selected such that there is space in one bearing shell for the cord drum and in the other bearing shell for the flat spiral spring.

5. The measuring cord displacement transducer as claimed in claim 1, wherein at least one of the bearing shells and the housing is designed to be non-round in its external cross section.

6. The measuring cord displacement transducer as claimed in claim 1, wherein the flat spiral spring is enclosed in the bearing shells so that a circumference of a recess for the flat spiral spring is somewhat greater than its external circumference when the measuring cord is completely wound on the cord drum, and the circumferential contour of the recess has, in one circumferential region, a radially outwardly directed broadening for accommodating a fixing pin for the outer end of the flat spiral spring.

7. The measuring cord displacement transducer as claimed in claim 1, wherein one of the bearing shells has at least two opposite, circular arc-shaped guide curves pointing towards the other of the bearing shells, which guide curves engage in a corresponding, circular ring-shaped recess of the other bearing shell.

8. The measuring cord displacement transducer as claimed in claim 1, wherein a cord attachment, which projects radially out of at least one of the bearing shells, can be pushed in axially off center in the bearing shell accommodating the cord drum, and a recess for accommodating the cord drum is broadened in at least one corner region.

9. The measuring cord displacement transducer as claimed in claim 1, wherein one of the bearing shells forms the end of the displacement transducer, one bearing of the shaft is arranged in its interior in a bearing depression forming a blind hole, and another bearing of the shaft is arranged in a through opening of the other bearing shell in a through bearing opening.

10. The measuring cord displacement transducer according to claim 1, wherein recesses in at least one of the bearing shells and the electrical housing are broadened so as to achieve greatest possible wall thicknesses in corner regions of the at least one of the bearing shells and the electrical housing.

11. The measuring cord displacement transducer as claimed in claim 1, wherein threaded holes for assembly of the displacement transducer are arranged in regions having relatively great wall thickness of at least one of the bearing shells and run in the transverse direction.

12. The measuring cord displacement transducer as claimed in claim 1, wherein the shaft is supported in the bearing shells by sliding bearings.

13. The measuring cord displacement transducer as claimed in claim 1, wherein the shaft is supported by a radial sliding bearing and a separate axial sliding disk as an axial bearing.

14. The measuring cord displacement transducer as claimed in claim 1, wherein the shaft has, in a region accommodating the flat spiral spring, a longitudinally extending slot for insertion of a bent-over portion at an inner end of the flat spiral spring.

15. The measuring cord displacement transducer as claimed in claim 14, wherein the shaft is designed as a hollow shaft in its end regions so that a wall of the hollow shaft is penetrated by the slot.

16. The measuring cord displacement transducer as claimed in claim 1, wherein end recesses of the shaft in the axial direction do not pass through the region of the cord drum mounted on the shaft, and the cord drum is fastened on the shaft in a non-positive manner by pushing on axially secured by a tolerance ring which consists of a flexible material, and designed in cross section to be corrugated in the circumferential direction.

17. The measuring cord displacement transducer as claimed in claim 3, wherein the electrical housing and at least one of the bearing shells adjacent thereto have at least one conductive surface.

18. The measuring cord displacement transducer as claimed in claim 3, wherein the electrical housing one of the two bearing shells adjacent thereto consist of nonconductive material and have a conductive surface coating.

19. The measuring cord displacement transducer as claimed in claim 3, wherein the electrical housing and at least one of the two bearing shells adjacent thereto have an average wall thickness and a mutual overlap in the axial direction which protect against penetrating electromagnetic radiation.

20. The measuring cord displacement transducer as claimed in claim 8, wherein the cord attachment can be selectively mounted in at least one of the bearing shells without separating the bearing shells or an electrical housing from one another.

21. The measuring cord displacement transducer as claimed in claim 8, wherein a sliding piece is exchangeably fastened in the cord attachment for through guidance of the measuring cord by split taper pins introduced transverse to the cord direction.

22. The measuring cord displacement transducer as claimed in claim 1, wherein an opening in the sliding piece, facing the interior of the displacement transducer, is widened.

23. The measuring cord displacement transducer as claimed in claim 1, wherein the cord drum has, in its external circumferential surface, an annular groove for accommodating winding of the measuring cord, which groove is bounded by end flanks of the cord drum.

24. The measuring cord displacement transducer as claimed in claim 1, wherein a bottom of an annular groove of the cord drum provides space only for one winding of the measuring cord.

25. The measuring cord displacement transducer as claimed in claim 1, wherein the flat spiral spring is held at a spacing from at least one of the bearing shells as a result of a slight axial projection of a radial sliding bearing of the shaft above a bottom surface.

26. The measuring cord displacement transducer as claimed in claim 1, wherein the outer circumference of the shaft is cylindrical as far as the depression for accommodating a tolerance ring, and the cord drum and flat spiral spring are held at the correct axial spacing from one another by a spacer arranged between them.

27. The measuring cord displacement transducer as claimed in claim 26, wherein the spacer has as small as possible a bearing surface on that end facing the cord drum.

28. The measuring cord displacement transducer as claimed in claim 26, wherein the spacer is sealed off at its outer circumference with respect to the surrounding housing of the mechanical interior.

29. The measuring cord displacement transducer as claimed in claim 1, wherein sealing of the mechanical interior with respect to the electrical interior is effected by a V sealing ring arranged on the side of the mechanical interior in an annular radial broadening of the bearing opening, a freely ending annular edge of said V sealing ring pointing into a corner of the annular broadening and resting on an end face of the broadening, but ending with as small a spacing as possible in front of the radial inner circumferential surface of the broadening.

30. The measuring cord displacement transducer as claimed in claim 29, wherein the cord drum is held at a spacing in relation to the V sealing ring by an annular run-on disk whose outer circumference is smaller than the outer circumference of the broadening.

31. The measuring cord displacement transducer as claimed in claim 3, wherein screw fixing of the bearing shells to each other is effected by two axially directed screws in opposite corners, while screw fixing of the electrical housing to at least one of the bearing shells which is adjacent to it is effected in the two other corners.

32. The measuring cord displacement transducer as claimed in claim 3, wherein a connecting screw runs in the interior of the electrical housing and between the electrical housing and the adjacent bearing shell and, at least over part of its axial length, has a non-round outer cross section and is embraced by a fork-shaped end of a sheet metal fork which is connected in a rotationally fixed manner to the rotary angular encoder and diverges radially away from the angular encoder.

33. The measuring cord displacement transducer as claimed in claim 32, wherein the sheet metal fork is designed as a knife-like blade, at least at inwardly pointing edges pointing into its recess at the fork-shaped end onto the non-round outer cross section the connecting screw.

34. The measuring cord displacement transducer as claimed in claim 33, wherein the knife-like blade of the sheet metal fork is produced by etching a maximally 1.0 mm thick sheet metal fork.

35. The measuring cord displacement transducer as claimed in claim 3, wherein the connecting screw is one of a plurality of connecting screws comprising at least one first threaded bolt with a non-round outer cross section which is screwed with its coaxial thread extension into one of the bearing shells, and wherein a headed screw for holding the electrical housing on the threaded bolt is screwed into a coaxial threaded bore of said one of the bearing shells which is arranged on an opposite end.

36. Measuring cord displacement transducer as claimed in claim 32, wherein, in a mounted condition, the outer cross section of the connecting screw is embraced by the sheet metal fork and is rotated to such an extent that it comes with its outer surfaces into the smallest possible spacing from edges directed towards the outer cross section of the sheet metal fork without being braced between the latter.

* * * * *